(12) United States Patent
Uemura et al.

(10) Patent No.: US 8,057,304 B2
(45) Date of Patent: Nov. 15, 2011

(54) GAME MACHINE

(75) Inventors: Hiroshi Uemura, Tokyo (JP); Tomonori Nebuya, Tokyo (JP); Taro Nishiyama, Tokyo (JP); Shuichi Kitamura, Tokyo (JP)

(73) Assignee: Sega Corporation, Tokyo (JP)

( * ) Notice: Subject to any disclaimer, the term of this patent is extended or adjusted under 35 U.S.C. 154(b) by 472 days.

(21) Appl. No.: 12/309,412

(22) PCT Filed: Jun. 11, 2007

(86) PCT No.: PCT/JP2007/062189
§ 371 (c)(1),
(2), (4) Date: Jan. 16, 2009

(87) PCT Pub. No.: WO2008/010372
PCT Pub. Date: Jan. 24, 2008

(65) Prior Publication Data
US 2009/0305791 A1 Dec. 10, 2009

(30) Foreign Application Priority Data
Jul. 21, 2006 (JP) .................................. 2006-200130

(51) Int. Cl.
*A63F 13/00* (2006.01)
*A63F 9/24* (2006.01)
*G06F 17/00* (2006.01)
*G06F 19/00* (2011.01)

(52) U.S. Cl. ........................................... 463/29; 463/43

(58) Field of Classification Search .................... 463/43, 463/29
See application file for complete search history.

(56) References Cited

U.S. PATENT DOCUMENTS
2004/0157654 A1 8/2004 Kataoka et al.
2005/0043089 A1* 2/2005 Nguyen et al. .................. 463/29
2007/0238530 A1* 10/2007 Okada ............................ 463/42

FOREIGN PATENT DOCUMENTS
JP 8-332281 12/1996
(Continued)

OTHER PUBLICATIONS
International Search Report issued Jul. 10, 2007 in the International (PCT) Application No. PCT/JP2007/062189.

*Primary Examiner* — Thien F Tran
(74) *Attorney, Agent, or Firm* — Wenderoth, Lind & Ponack, L.L.P.

(57) ABSTRACT

To provide a game machine capable of recording a play score for a team constituted of self and partners in a portable recording medium separately for each team, and executing team-specific game processing by using recorded data regarding the team.

Comprising a means for reading data from a first recording medium mounted on a mounting unit of the game machine by a first player, reading data from a second recording medium mounted by a second player, and determining them both to be a team when a recording medium-specific ID other than self's is recorded in at least one of the first and second recording media and the means for ascribing information about a competition score during a game progress or a competition result from cooperative competition of the team to the recording medium-specific ID of a cooperator, to record it in at least one recording medium of the first and second recording media as team score recording data of the team.

13 Claims, 16 Drawing Sheets

FOREIGN PATENT DOCUMENTS

| | | |
|---|---|---|
| JP | 11-207031 | 8/1999 |
| JP | 2001-104649 | 4/2001 |
| JP | 2003-205176 | 7/2003 |
| JP | 2004-8578 | 1/2004 |
| JP | 2004-38579 | 2/2004 |
| JP | 2006-187638 | 7/2006 |
| WO | 02/47780 | 6/2002 |

* cited by examiner

| User-specific ID (a) |
| Recording frequency (50) |
| Personal score recording data |
| Score recording data of cooperator c |
| Score recording data of cooperator f |
| ⋮ |
| Score recording data of cooperator d |
| Free space |

| User-specific ID (b) |
| Recording frequency (5) |
| Personal score recording data |
| Score recording data of cooperator a |
| Score recording data of cooperator h |
| Score recording data of cooperator f |
| Free space |

| ID (user f) |
| Frequency of recording (270) |
| Personal score recording data |
| Score recording data of cooperator e |
| Score recording data of cooperator h |
| Free space |

| PvP competition points | A |
|---|---|
| Player (team) won competition | 10 points |
| Player (team) lost competition | 5 points |
| PvP competition bonus points | B |
| Total value of strength of 2 characters is lower than that of opponent | 5 points |
| Won against an opponent who has had 3 or more consecutive wins | 5 points |
| PvP competition rank bonus points | C |
| Won against a player of same rank in a single match | 50 points |
| Won against a player of same rank | 50 points |
| Won against a player of higher rank in single match | 5 points |
| Won against team of higher rank | 5 points |
| Competition against CPU points | D |
| Won against the CPU | 2 points |
| Lost against the CPU | 1 point |

FIG.12

How to get battle points

| PvP competition | | | |
|---|---|---|---|
| | 1P (using IC) | VS | 1P (using IC) |
| Gettable points | Personal points A·B·C | | Personal points A·B·C |
| | 1P (using IC) | VS | 1P (without using IC) |
| Gettable points | Personal points A·B | | No points |

FIG.13

| Cooperative play VS Cooperative play | | | |
|---|---|---|---|
| | Cooperative play (team)<br>1P (using IC)<br>2P (using IC) | VS | Cooperative play (team)<br>1P (using IC)<br>2P (using IC) |
| Gettable points | Personal points A·B<br>Team points A·B·C | | Personal points A·B<br>Team points A·B·C |
| | Cooperative play (team)<br>1P (using IC)<br>2P (using IC) | VS | Cooperative play (no team registered)<br>1P (using IC)<br>2P (using IC) |
| Gettable points | Personal points A·B<br>Team points A·B | | Personal points A·B |
| | Cooperative play (no team registered)<br>1P (using IC)<br>2P (using IC) | VS | Cooperative play (no team registered)<br>1P (using IC)<br>2P (using IC) |
| Gettable points | Personal points A·B | | Personal points A·B |
| | Cooperative play (team)<br>1P (using IC)<br>2P (using IC) | VS | Cooperative play<br>1P (using IC)<br>2P (without using IC) |
| Gettable points | Personal points A·B<br>Team points A·B | | Personal points A·B (1P only) |
| | Cooperative play<br>1P (using IC)<br>2P (without using IC) | VS | Cooperative play<br>1P (using IC)<br>2P (without using IC) |
| Gettable points | Personal points A·B (1P only) | | Personal points A·B (1P only) |
| | Cooperative play (team)<br>1P (using IC)<br>2P (using IC) | VS | Cooperative play<br>1P (without using IC)<br>2P (without using IC) |
| Gettable points | Personal points A·B<br>Team points A·B | | No points |

FIG.14

| Cooperative play VS Personal play | | | |
|---|---|---|---|
| | Cooperative play (team) 1P (using IC) 2P (using IC) | VS | 1P (using IC) |
| Gettable points | Personal points A·B Team points A·B | | Personal points A·B |
| | Cooperative play (team) 1P (using IC) 2P (using IC) | VS | 1P (without using IC) |
| Gettable points | Personal points A·B Team points A·B | | No points |
| | Cooperative play (no team registered) 1P (using IC) 2P (using IC) | VS | 1P (using IC) |
| Gettable points | Personal points A·B | | Personal points A·B |
| | Cooperative play 1P (using IC) 2P (without using IC) | VS | 1P (using IC) |
| Gettable points | Personal points A·B (1P only) | | Personal points A·B |
| | Cooperative play 1P (using IC) 2P (without using IC) | VS | 1P (without using IC) |
| Gettable points | Personal points A·B (1P only) | | No points |

FIG.15

| 10th or higher dan | Total points | Points required for advancing to a higher class |
|---|---|---|
| 1st to 9th dan | | |
| 1st class | | |
| 2nd class | 1350 | 270 |
| 3rd Class | 1080 | 240 |
| 4th Class | 840 | 210 |
| 5th Class | 630 | 180 |
| 6th Class | 450 | 150 |
| 7th Class | 300 | 120 |
| 8th Class | 180 | 90 |
| 9th Class | 90 | 60 |
| 10th Class | 30 | 30 |
| No class (no ID card) | | |

FIG.16

| Player name | Opponent name |
|---|---|

| Title | 1st class |
|---|---|
| Battle points | 300 |

FIG.17

GAME MACHINE

BACKGROUND OF THE INVENTION

1. Field of the Invention

The present invention relates to a game machine using a portable recording medium such as an IC card, and more specifically to a game machine designed for using a user-specific ID stored on the recording medium to identify a player.

2. Description of the Related Art

A game machine which is capable of recording a competition history against an opponent and skill data relating to a player character on a recording medium such as an IC card held by the player, for example, is described in Japanese Published Unexamined Patent Application No. 1996-332281. According to such a game device, using the data recorded in the recording medium enables the device to recognize an opponent player matched in the past and recall a competition score against that opponent player. Furthermore, an obtainable effect is that in every competition against the opponent player, it becomes possible to update the skill data and the competition history of the player character to increase the interest of the competition game. In addition, a communication game system which treats the data of a plurality of player characters as a single team to allow competition against other such teams or a CPU-controlled character and team is described, for example, in Japanese Published Unexamined Patent Application No. 2001-104649. This publication has disclosed a game system in which a file containing game data regarding each team is sent from each of a plurality of individual game terminal devices to a server and the competition between teams is simulated on the server. Moreover, Japanese Published Unexamined Patent Application No. 2004-008578 and International Publication Number WO2002/047780 disclose a competitive communication game system containing a team play, in which each of a plurality of players provides a recording medium which has recorded on it a variety of parameter data regarding game characters used by each player and a user-specific ID for making up a team to compete against a team of other players and a character and team operated by CPU control.

SUMMARY OF THE INVENTION

In conventional game devices and communication game systems as described above, using a recording medium such as an IC card, technical consideration has not been given to a game in which the competition is operated in cooperation with other players by making a team. In addition, the data to be recorded on the recording medium is mainly game progress data and score data for individual players and it is not possible, for example, to know what score was made for a team by a particular combination of players. Furthermore, in game processing which is specific to a team using recorded data, such as progressing by changing the presentation and character performance in a combination of partners in an interpersonal game of one team against another, making up the team on the basis of recorded data for the team, it cannot execute processing reflecting the names of the players in the team in the game progress.

The present invention is created in consideration of the above-described situation. The aim of the present invention is to provide a game machine capable of recording play score data for a team which is made up of a "self" player and other players, for every player making up the team in a portable recording medium separately from individual score data of the player, and which is capable of executing the game processing in a manner specific to a team repeatedly made up of the same partners by using the recorded data of that team. In addition, the aim of the present invention is to provide a game machine capable of achieving the above object even with a recording medium having a small memory capacity.

The present invention relates to a game machine uses the recording medium which is demountable from a mounting unit of a main body and capable of writing data, the game machine having a cooperative play mode to allow play to include cooperation with other players. The object of the present invention is achieved by reading the data of a first recording medium mounted on the mounting unit by a first player and reading the data of a second recording medium mounted on another mounting unit, which may be identical to the mounting unit as described above, by another player, checking whether a recording medium-specific ID of the other player is recorded on the first recording medium or whether the recording medium-specific ID of the first player is recorded on the second recording medium, and comprising a team recognition means, by which, when a recording medium-specific ID other than self's recording medium-specific ID is recorded in at least one of the recording mediums, both are determined to be members of a team and a data writing means, by which information expressing a play score during a game in progress or a result of the competition by cooperative play of teams recognized by the team recognition means is recorded in at least one recording medium of the first and the second recording media as a team score, recording data regarding the team by matching the recording medium-specific ID of an cooperator.

The object of the present invention is more effectively achieved by:
comprising a recording target determination means for determining one recording medium which is possessed by a member of a team to be the recording target of the team score recording data;
characterized in that the data writing means determines whether the team score recording data of the team is present or not in the recording medium determined by the recording target determination means and if present, the team score recording data is written by overwriting;
and if not, the team score recording data is written and the data writing means determines whether the team score recording data of the team is present or not in the recording medium of any other member of the team and if present, that team score recording data is deleted;
that the recording target determination means determines the recording target based on determination references including a number of teams determined from a number of team score recording data recorded in each recording medium separately according to teams, current recording frequency of the recording medium, and a determination reference containing a remaining memory capacity of the recording medium; and
that the user-specific ID is composed of a system-specific ID and a user name defined by the player.

The object of the present invention is more effectively achieved by:
comprising a game progress controlling means for changing game progress in the cooperative play mode on the basis of the team score recording data;
comprising a means for determining a cooperative play level expressing a degree of excellence of the score of the team at the start of the game on the basis of the team score recording data, characterized in that the game progress controlling means changes the game progress in the cooperative play mode according to the cooperative play level;

comprising a team score evaluation means for evaluating the play score of the team on the basis of evaluation factors including the team score recording data and an execution result of the game, characterized in that the data writing means updates the team score recording data on the basis of an evaluation result of the team score evaluation means;

further characterized in that the data writing means assigns the play score data to the user-specific ID of the cooperator to record it in the recording medium by correspondence with a team name defined by the player;

comprising a recording medium issuing means for issuing the recording medium following insertion of a coin; and that the game machine is a communication game machine configured integrally by joining the cases of two sets of game devices connected communicably; and comprising a user identification information registering means, which registers user identification information for identifying the player in a memory unit of the recording medium possessed by the player.

According to the present invention, it becomes possible to record the play score of the team, which is composed of the "self" member and other cooperating members, separately for each team in the portable recording medium, and to execute the game processing specific to each team by using the recorded data of the team. Furthermore, the identification information of each other player making up the team is recorded together with the team score. Thus, for example, indicating a name of the player who produced the score and reflecting it in the game allows increased motivation for matching between players and increased motivation for repeated play with the same team, thereby adding interest. Moreover, the invention has a means for recognizing the members composing the team from the recorded data of the recording medium. Hence, a game program can determine which members combined to make the team that produced a score. According to inventions according to claims 2 to 5, a memory area of the recording medium can be effectively used and, therefore, a recording medium having a low memory capacity can be used as the recording medium for the game machine.

BRIEF DESCRIPTION OF THE DRAWINGS

FIG. 11 is the schematic view explaining a recording form of the ID card according to the present invention;

FIG. 12 is a first explanatory figure related to a game score data and indication mode thereof in the present embodiment;

FIG. 13 is a second explanatory figure related to the game score data and indication mode thereof in the present embodiment;

FIG. 14 is a third explanatory figure related to the game score data and indication mode thereof in the present embodiment;

FIG. 15 is a fourth explanatory figure related to the game score data and indication mode thereof in the present embodiment;

FIG. 16 is a fifth explanatory figure related to the game score data and indication mode thereof in the present embodiment; and FIG. 17 is the schematic view showing an example of a score indication screen in the present embodiment.

DESCRIPTION OF THE PREFERRED EMBODIMENTS

An embodiment of the present invention will now be described in detail with reference to the drawings. The game device according to the present invention is described using a competition type communication game machine constructed by connecting two sets of game devices to each other, as an example. The embodiment can be applied to a communication game system having two or more sets of game devices, which has two or more operation units and is of a type capable of play by cooperating teams, each composed of two or more players connected to each other via a network. In addition, the present embodiment is not restricted to a competition game and furthermore, the kind of game and hardware configuration is not restricted to this embodiment of the present invention. The cooperative play according to the present invention is a mode of playing against another player, a character operated by a controlling CPU, or a team composed of both by making up a team composed of a plurality of players.

Figure 1:
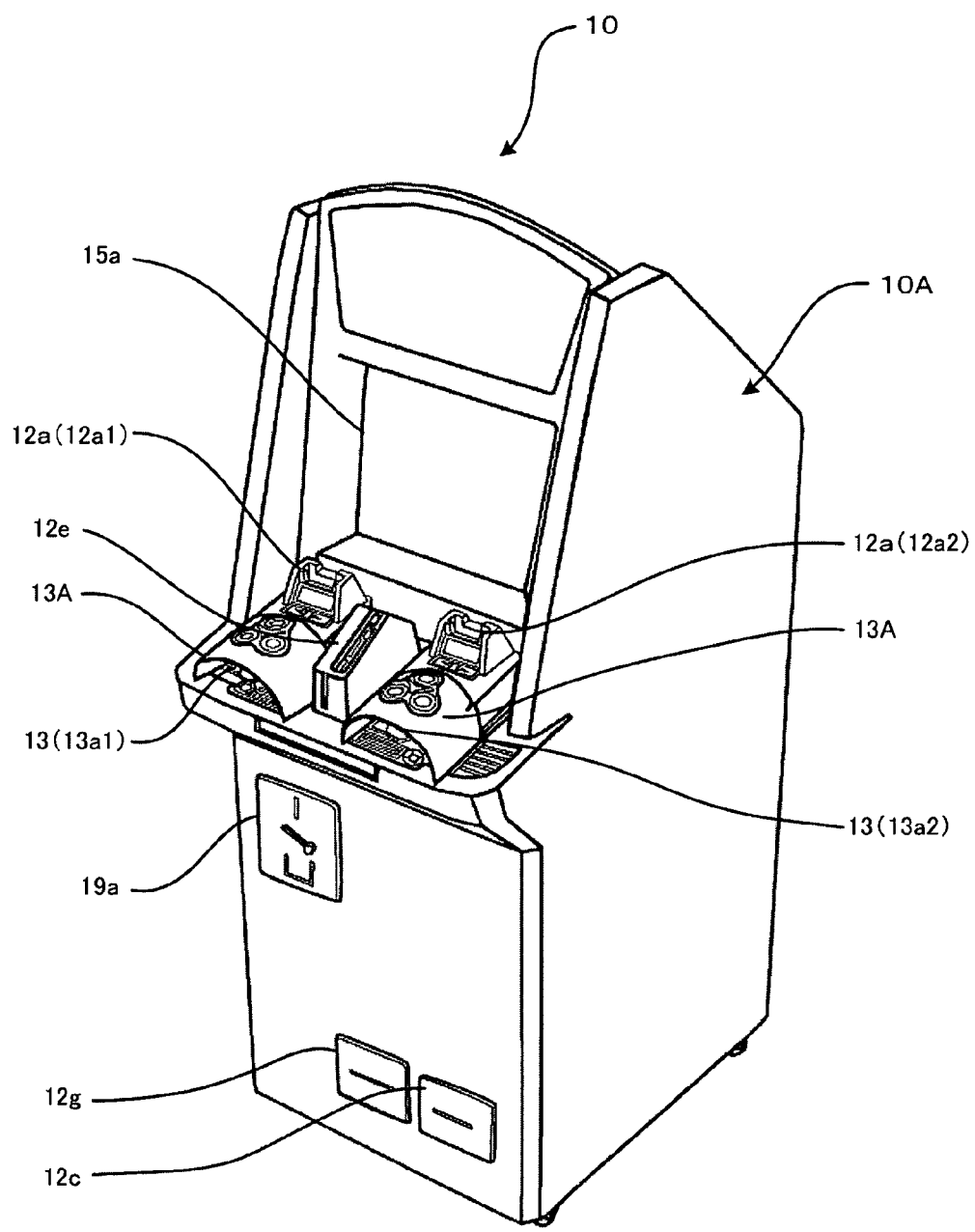
FIG. 1 is a perspective view showing an external view of an example of a game device according to the present invention.

FIG. 1 is a block diagram showing an example of a hardware constitution of a game device according to the present invention. According to FIG. 1, the game device 10 has a display 15a (in the present example, a liquid crystal display) on top of a front part of a case 10A and, on a bottom part thereof, two ID card mounting units (recording medium mounting units) 12a, which are used for mounting the recording medium (this user-specific ID recording medium is hereinafter termed "ID card") having a user-specific ID (user identification information) described later, and two operational units 13 are mounted in the left and right sides of the device, corresponding to two players. The ID card is a data-recording medium held by the player and a play score of the game is recorded in a memory unit of the ID card.

A cover 13A installed to cover the operational unit 13 is used for hiding the player's hands to prevent the other player seeing the player's operation and is rotatably configured around an axis in a direction of its depth. This game device 10 can execute the game using a play of "rock, paper and scissors" on three corresponding operation buttons as a game factor. When the game is played, the player operates the buttons in such a way that the operation buttons are covered with the cover 13A.

A central part between the two ID card mounting units 12a has a slot 12e for reading code information (in this example, a bar code printed on a paper card) indicated on a character card. The character card is a card issued for different kinds of characters. On a surface of the card a game character, for example, to be operated by the player is visibly printed and information about the kind and strength of the character (in the example, a beetle) is encoded. In addition, as an auxiliary card, there is a card on which code for a variety of parameters (kind of techniques) has been printed. The parameter information of the auxiliary card is read from the slot 12e, applied to the operation buttons to be used by the player, and stored in the memory unit of the game device.

The bottom of the operational unit 13 has an insertion slot 19a for a coin, and inserting a coin as indicated by a guiding screen allows starting of the game and purchasing of an ID card. On the ID card purchased by the player, the user identification information (the user-specific ID) has been written to identify the player before issuing. The card is issued from an ID card issuing slot 12c, which is shown in FIG. 1, opening at the front bottom of the case 10A. To the left of the ID card issuing slot 12c is a character card issuing slot 12g. Following the execution of the game, a predetermined character card is issued from the character card issuing slot 12g.

The outline of the game using the character card will now be described. In the game using the play of rock, paper and scissors as the game factor, the corresponding game character read from a character card possessed by each player is indicated on the display 15a to execute, for example, the competition game of a self character against an opponent character on the basis of code information on the character card, parameter information on the auxiliary card corresponding to the operation buttons, and operation information for the operation buttons. The communication game apparatus using two sets of the game machines is configured so that two players make a team to operate the game machine to execute a competition type communication game against an opponent team.

Figure 2:
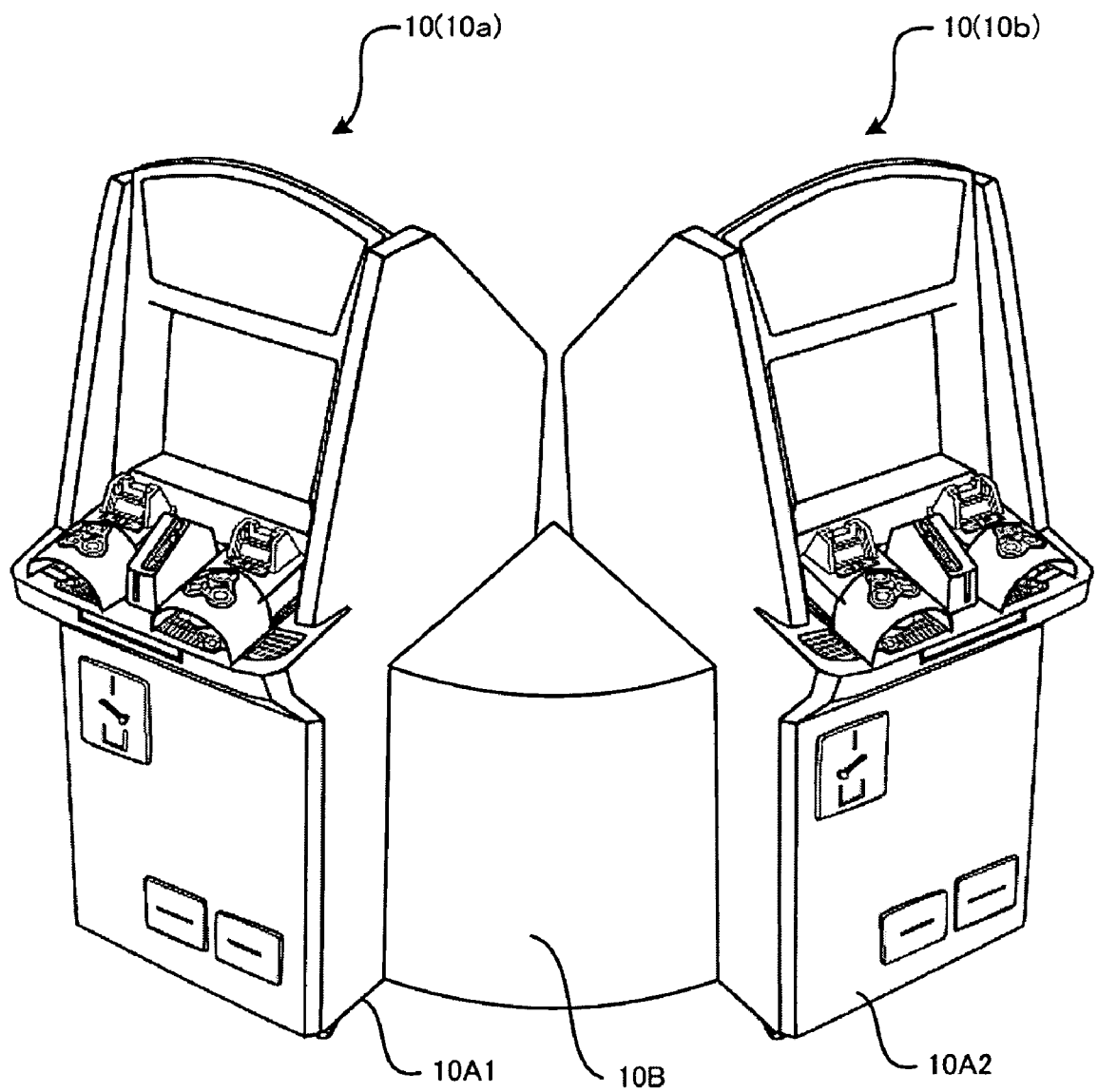
FIG. 2 is a perspective view showing an external view of an example of a game machine using two sets of the game device of FIG. 1.

In the following, a description is made of an example of a competition type communication game machine configured by connecting two sets of the game device 10 of FIG. 1. FIG. 2 is a perspective view showing an example of the external constitution of a communication game machine (hereinafter, game machine) using two sets of the game device of FIG. 1. The game machine according to the present invention is constituted by treating two game devices 10 connected communicably to each other as one set and by integrally joining the cases of those devices 10. Specifically, as shown in the example of FIG. 2 for instance, a rear part of the right side face of a case 10A1 of a game device 10a is attached to the rear part of the left side face of a case 10B1 of a game device 10b and the two game devices 10a and 10b are obliquely located to make a predetermined angle between the side faces of their respective cases, to be joined with a spacer 10B filling the gap between them, resulting in an integral constitution of two game devices 10 into one game machine.

Figure 3:
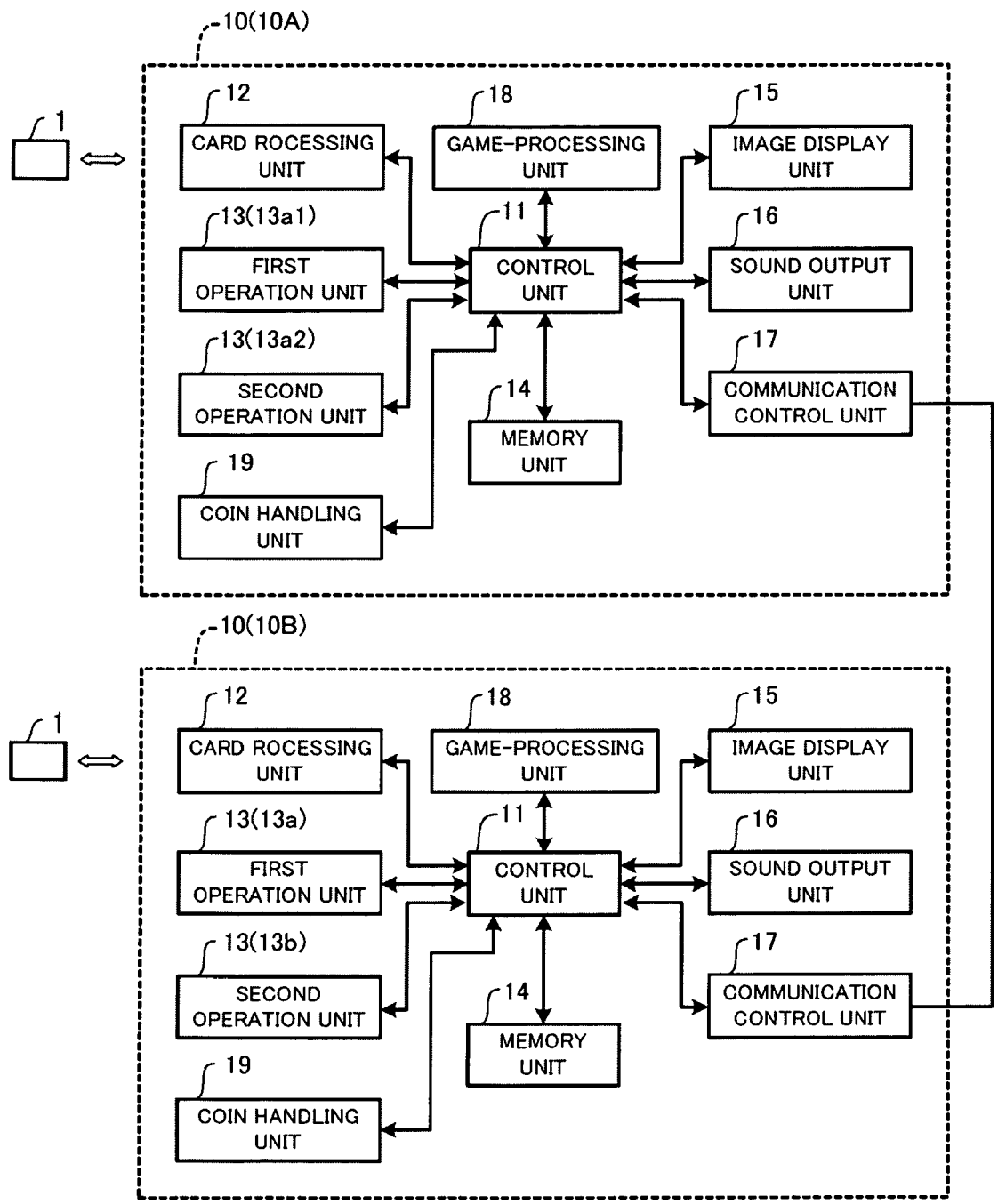
FIG. 3 is a block diagram showing an example of an internal constitution of the game machine of FIG. 2.

FIG. 3 is a block diagram showing an example of the internal constitution of the game machine of FIG. 2. In the game machine, the game devices 10A and 10B are communicably connected to each other via a cable and each of the game devices 10A and 10B has a control unit 11, a card processing unit 12, operation units 13, a memory unit 14, an image display unit 15, a sound output unit 16, a communication control unit 17, a game-processing unit 18 and a coin handling unit 19.

Figure 4:
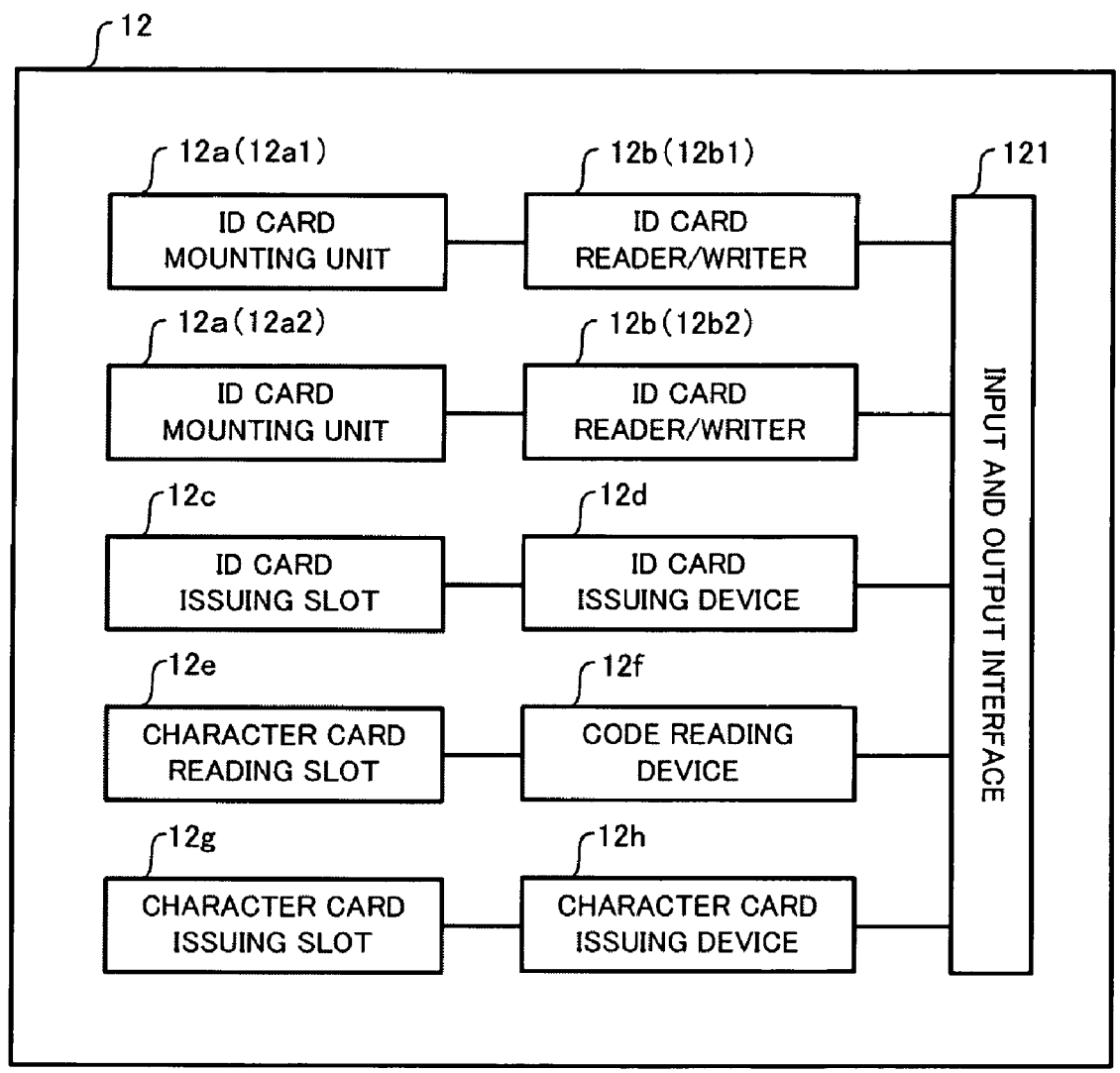
FIG. 4 is a block diagram showing an example of a constitution of a card-processing unit of the game machine of FIG. 3.

The control unit 11 is composed of a CPU and other components and carries out execution control of a computer program and input and output control for peripheral apparatuses via an input/output interface. The card processing unit 12 is, as shown in FIG. 4, composed of ID card mounting units 12a (12a1 and 12a2,) ID card reader/writers 12b (12b1 and 12b2,) an ID card issuing slot 12c, an ID card issuing device 12d as an ID card issuing means, a character card reading slot 12e, a code reading device 12f as a code information reading means, a character card issuing slot 12g, and a character card issuing device 12h as a character card issuing means in order to process the reading and writing of data from and to the ID card, reading the code of the character card, and processing issue of the ID card and the character card. The operation unit 13 comprises an input device composed of a button switch and other parts for inputting operation information by the player and has, in the present example, two operation units 13a1 and 13a2.

The memory unit 14 is composed of predetermined recording mediums such as a memory and a RAM, and a program and data which include a processing routine for execution of each means, described later, by a computer, and which are previously stored (or, stored by reading from an external storage medium such as a DVD (digital versatile disk)). The image display unit 15 comprises a display device such a liquid crystal display and the sound output unit 16 comprises a sound circuit and a sound output device such as a speaker. The communication control unit 17 comprises a data transfer control circuit and other components to control communications between game devices. The game-processing unit 18 comprises a game processing program and an image-processing device to operate the processing of progress control of the game according to the operation of an operation means by the player. The coin handling unit 19 comprises a coin identification device and other components to operate identification and counting processing of the coins inserted in the insertion slot 19a.

A hardware apparatus housed in the game device 10 are of types already known and descriptions of the operation of individual apparatus will be omitted.

Next, the configuration of the ID card used in the present invention will be described. The ID card used in the present invention is separate from the game machine and a game program-recording medium and is a demountable user-specific ID-recording medium connectable with a recording medium-mounting unit of the game machine. The embodiment of the present invention uses an IC card on which an IC chip has been mounted. However, as an alternative to the IC card, a memory medium such as a memory stick or memory card (trade mark registered) having a memory area can be used. Alternatively, according to the present embodiment, ID cards previously allocated a system specific ID can be pooled in the ID card issuing device 12d and, as described before, the player can purchase the ID card by inserting a coin in the insertion slot 19a.

Figure 5:
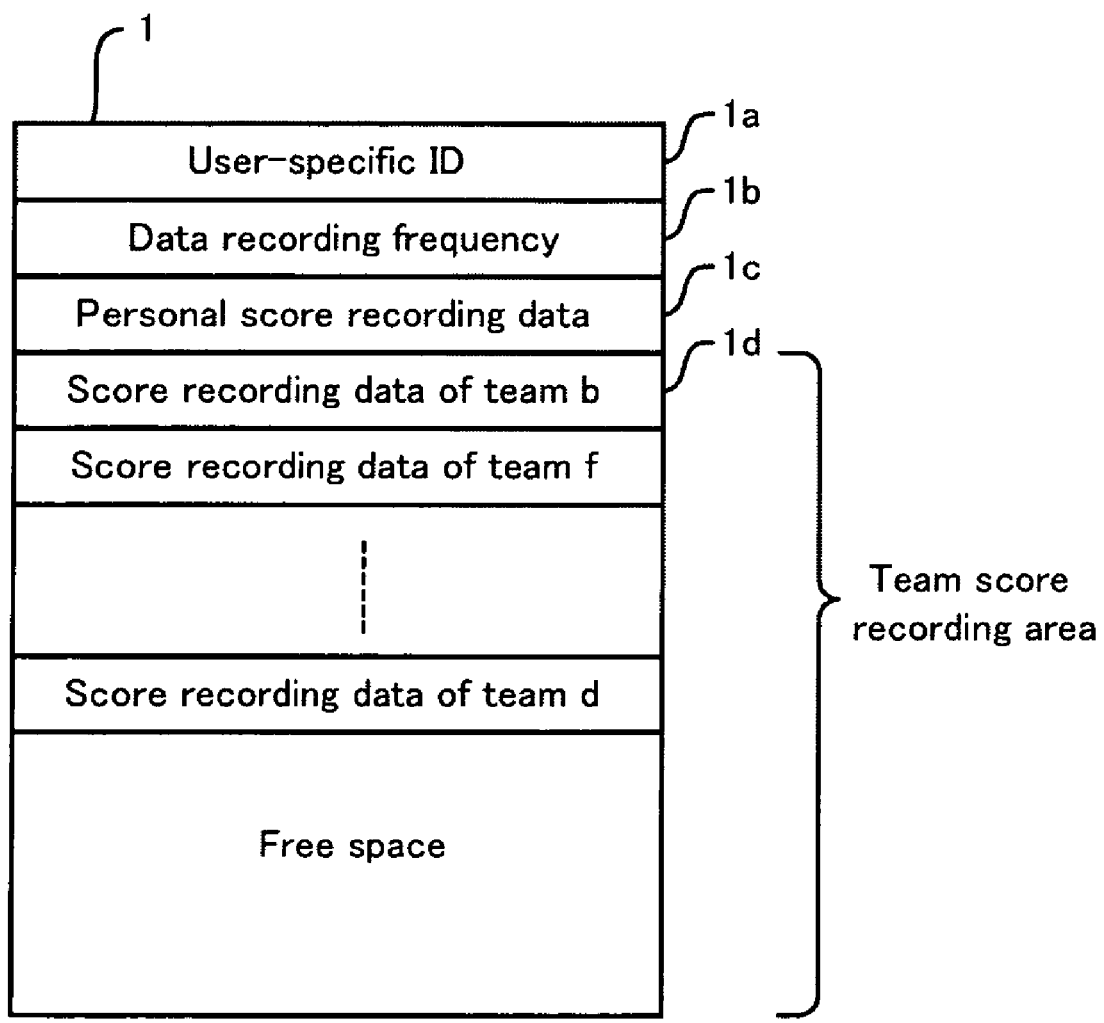
FIG. 5 is a schematic view showing an example of a data constitution of an ID card according to the present invention.

FIG. 5 is a schematic view showing an example of the data constitution of the ID card according to the present invention. On the ID card 1, as shown in FIG. 5, data such as user identification information 1a (hereinafter, the user-specific ID), data recording frequency 1b, personal score recording data 1c, and team score recording data 1d are recorded. The user-specific ID 1a is a unique ID corresponding to an individual player and, for example, is composed of the system-specific ID as described above and a user name (for example, an arbitrary name made from about eight letters selected from hiragana, katakana, and Roman alphabet) defined by input from the player by the operating operation unit 13.

The ID card will be described using an ID card in which the system-specific ID is previously recorded as an example. However, for example, the embodiment may alternatively be one in which the game device gives the system-specific ID; one game device has the means for giving the system-specific ID or both game devices have the means for giving the system-specific ID by information exchange between game devices.

The data recording frequency 1b is information showing a recording frequency corresponding to reading and writing of data on the ID card and is used mainly as information for monitoring the life of the ID card. The data recording frequency 1b is, for example, composed of a rewriting guarantee frequency and a counter value. When the ID card is used for the first time (in the present example, at the time of purchasing the ID card,) the rewriting guarantee frequency and the counter value (initial value=0) are written in and the counter value is updated according to data reading and writing from and to the ID card.

The personal score recording data 1c is information showing the score of the player in a single player mode. As the personal score recording data 1c, a total score value (the value accumulated so far) calculated by evaluation from a predetermined algorithm according to the kind of game, or a total score factor used for conversion to the total score value, or both these values, are recorded. In other words, according to the present embodiment the recording is not operated by accumulating the scores of each game in a time sequence, but rather by overwriting at the finish of the game using one of either total score value or the total score factor or both of these as the score recording data. According to the present embodiment, the total score factor is overwritten for recording as the score recording data at the finish of the game.

The team score recording data 1d is information showing the play score for each team and, as shown in FIG. 5, as exemplified by the score recording data of a team b (two members are shown in the embodiment, but, for example, if three members comprise a team, the data is constituted of "each user-specific ID+team score of two partners") and the score recording data of a team f, the play score is recorded when the same game is executed against the opponent team by a cooperating team composed of the self and other players. According to the game machine in FIG. 2, for example, two members operating the game machine 10a become self's team and two members operating in the game machine 10b become the opponent team. The team score recording data 1d may be recorded (which may include the team name, or the team name may be recorded in a separate area) corresponding to the team name (for example, the team name inputted by a player belonging to the team through the operation of the operation unit 13: for example, the arbitrary name made from about eight letters selected from hiragana, katakana, and Roman alphabet) to display team names of both teams on the display of the opponent team and on the display of self's team. At this time, the image (color and shape of the display) of the team name may be changed according to a rank of the team as described later.

The game machine according to the present invention, as described above, has a mode (hereinafter, cooperative play mode) for playing in cooperation with other players by having the team information showing the score of the team in the cooperative play mode separately recorded for each team. The team score recording data 1d is, for example, composed of the user-specific ID of partners (cooperators) and information showing the play score achieved by the cooperative play of the partners. Similar to the personal score recording data 1c, one of either total score value (total score value of the team, in this example, the total points) calculated by evaluation from the predetermined algorithm according to the kind of game, or the total score factor used for conversion to the total score value, or both (in the present embodiment, the total score factor only) are recorded as the team score recording data 1d. In this case, described later in detail, when recorded in the ID card in the cooperative play mode, the team score recording data 1d are recorded in the ID card of one of the two members making the team. When starting another game with the same team, the team is identified from the user-specific IDs 1a on the ID cards of the two members, and the team score recording data 1d for the team is processed by reading it from the ID card.

The total score factor for converting to the total score value is now described. Titles placed in quote marks with regard to the total score factor described below express the total score factor in the single player mode.

"Example of the Total Score Factor"

The total score factor is, for example, the score achieved in competition against the CPU (accumulated value of winning or losing: ?-?), the score achieved in a person vs person (PvP) competition (accumulated value of winning or losing: ?-?), the frequency of winning against a higher grade team/"player", the frequency of winning against a same grade team/"player", the frequency of winning in a situation where the total value of the strength of the self's player character is low in comparison with the opponent, and the frequency of consecutive wins against an opponent, a level showing a growth degree of the player character and an amount of nurturing in a growth game, and an accumulated value of correct to incorrect responses and the difficulty of a quiz in a quiz game. The total score value is calculated on the basis of these score factors and, in the cooperative play mode, the rank of the team is determined. Furthermore, a temporal factor such as the time elapsed before the win may be included as the total score factor.

Figure 6:
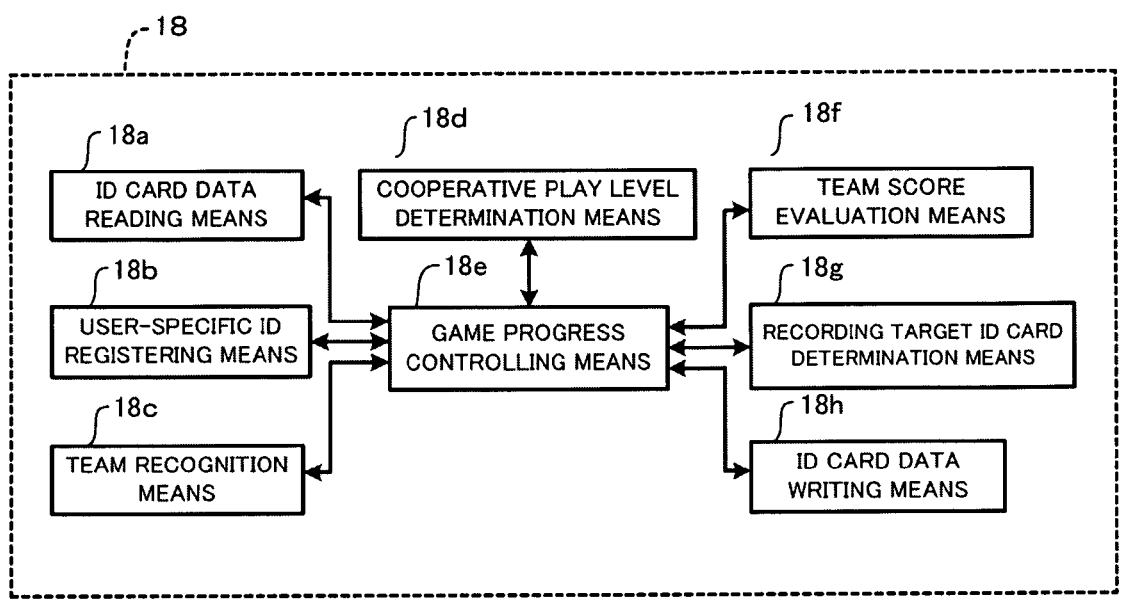
FIG. 6 is a functional block diagram showing an example of the constitution of a game-processing unit of the game machine according to the present invention.

Next, the principal elements of the game-processing unit 18 in FIG. 3 will be described below. FIG. 6 is a functional block diagram showing an example of the principal part of the game-processing unit 18 according to the present invention. Individual means 18a to 18h shown in FIG. 6 are embodied by the computer program controlled by a CPU 101 in the present embodiment, stored in the predetermined recording medium and work as a memory-resident program or an overlay program at execution. The individual means 18a to 18h have been classified according to function as a matter of convenience of explanation and do not limit the invention to a particular software constitution. In addition, this document describes mainly the means concerning the cooperative play mode, and general means, such as the personal play-specific means and image processing means, which relate to the personal play mode, have been omitted.

The game-processing unit 18 mounted on each game device 10 has, as principal elements, a ID card data reading means 18a, a user-specific ID registering means 18b, a team recognition means 18c, a cooperative play level determination means 18d, a game progress controlling means 18e, a team score evaluation means 18f, a recording target ID card determination means 18g and an ID card data writing means 18h.

The ID card data reading means 18a is a means for reading the recording data such as the user-specific ID 1a from the ID card according to a direction from the game progress controlling means 18e through the ID card reader/writer 12b of the processing unit 12 to store in the area of the memory unit 14.

The user-specific ID registering means 18b is a means for registering the user-specific ID to identify the player in the memory unit of the ID card possessed by the player. In the user-specific ID registering means 18b, on the basis of the user name and the system-specific ID inputted by the player, for example, the user-specific ID 1a is defined and, by writing the user-specific ID 1a into the ID card, the user-specific ID identifying the player is registered. According to the present embodiment, the system-specific ID is previously recorded in the ID card and, by writing the user name in the area of the ID card via the ID card reader/writer 12b, the user-specific ID 1a is registered in the ID card.

The team recognition means 18c has functions of reading each user-specific ID 1a from each ID card (in the present example, self's ID card and a partner's ID card) mounted on the ID card mounting unit 12a1 and 12a2 to detect team-constituting members (recognize a combination of members) on the basis of their user-specific ID 1a. In detail, the data on a first recording medium mounted on the ID card mounting unit 12a1 by a first player is read and the data on a second recording medium (including in the case of two or more partners, the recording medium of each partner) mounted on the ID card mounting unit 12a1 or another mounting unit (in the present example, the ID card mounting unit 12a2) by another player is read and whether the user identification information of that other player is also recorded on the first recording medium or the user identification information of the first player is recorded on the second recording medium is checked, and when the user identification information other than self's user identification information has been recorded on at least one, both are determined to be members of the team and each player identified by this user identification information is detected as a team-constituting member.

The cooperative play level determination means 18d is the means for determining the cooperative play level of the team at the start of the game on the basis of the team score recording data 1d for the team. The "cooperative play level" according to the present invention is a factor expressing the degree of excellence of the score resulting from the cooperative play of the team. The cooperative play level determination means 18d determines this factor with a predetermined algorithm using the team score recording data 1d read from the ID card. For example, in the competition game, the total score value is calculated on the basis of information regarding the total score factor included in the team score recording data 1d, the rank (class or dan grade) of the team is determined from the total score value or the total score value recorded as the team score recording data 1d and rank conversion data (a table expressing the correspondence between a range of the score value and the rank, or an operational formula for converting to the rank) and this rank is treated as the cooperative play level. At this time, if determined as having no team experience by the team recognition means 18c, the lowest rank is assigned. The personal play score level is determined on the basis of the personal score recording data 1c, in other words, treated separately from the cooperative play level to allow the case where a personal rank is high but cooperative play is at the lowest rank. The game progress controlling means 18e controls total progress of the game including processing in a standby status and processing from the start to the finish of the game, and changes the game progress on the basis of the score data (the play score at the start of the game of self's team against the opponent team) recorded in the ID card. For example, in the game using the character card described before, the game character (player character) is identified on the basis of the code information read from the character card at the start of the game to make a presenting screen and a sound when the player character appears appropriate to the level determined by the total score value (total point before this point in time). The information about the total score value or the level is sent to other game devices and the image expressing the strength of the opponent team is indicated on the display of self's game device.

The team score evaluation means 18f is the means for evaluating the play score of the team at the finish of the game. The result of the evaluation is reflected in the above-described total score factor recorded as the team score recording data and recorded in the ID card.

The evaluation factor for evaluating the play score will now be described. In the case of a competition game in the cooperative play mode, the evaluation factors for the play score include, for example, the following factors. Of these evaluation factors, the following evaluation factor (F1) is the factor obtained from the above described total score factor contained in the team score recording data 1d of the ID card.

[Examples of Evaluation Factors]

(F1) Score of self's team and the opponent team at the start of the game (the cooperative play level and a consecutive victories frequency for the team, which are converted from the total score factor of the team.)

(F2) Execution result of the game (score corresponding to winning or losing)

(F3) Mode of the game (single match, tag-team match, tournament play)

(F4) Member constitution (number of members, information about a player member or a CPU member) of the self's team and the opponent team (including the case where one team is composed of a single player)

(F5) Level of the character operated by the player (in the present example, the team total of values expressing degrees of strength of the player characters, which are read from the character cards of the players belonging to the team.)

In the team score evaluation means 18f, a point value is calculated and obtained as the score value of the game on the basis of evaluation factors as described above and, for example, the obtained point value and the rank (the cooperative play level) of the team at the completion of the game are indicated on the display of self's game device as the evaluation result. At that time, for example, when the evaluation result is outputted, the presenting screen and the sound are selected as those suitable for the evaluation result.

The team rank (the class and dan grades) determined on the basis of the team score recording data 1d will now be described with reference to examples. According to the present embodiment, the level expressing the degree of excellence (strength) of the score for cooperative play and for personal play is expressed using a plurality of classes (stages) such as no class, 10th class to 1st class, 1st dan to 9th dan, 10th or higher dan grade, and the points (the score value or the total score value of the game) required for advancing to a higher rank are previously defined in a table for each class and dan grade. A determination can be made whether or not an advance to a higher rank is achieved by comparing the points obtained from cooperative play in the game with the points required for advance to the higher rank. For instance, when the rank at the start of the game determined by the cooperative play level determination means 18d is 6th class and the points required for advancing to 5th class are 150 points, if the points obtained before the finish of the game exceed 150 points, determination is made that the rank of the team is advanced to 5th class. The points value (score value) obtained by the team is treated as the total score factor, the total score value reflected by adding the total score factor or the obtained points value is defined as the team score recording data 1d after the execution of the game, and the team score recording data 1d is recorded by overwriting on the ID card.

The recording target ID card determination means 18g is the means for determining, when recording the team score recording data 1d on the ID card in the cooperative play mode, whose ID card out of ID cards possessed by the constituting members of the team recognized by team recognition means 18c (in the present example, members identified by the user-specific ID of each ID card mounted on the ID card mounting unit 12a1 and a2), should be recorded on. In the recording target ID card determination means 18g, the number of teams recorded at present (the number of teams determined from the number of team score-recording data recorded separately according to teams) a current recording frequency of the ID card and the remaining memory capacity, for example, are set as conditions (determination references for determining the recording target) to determine the ID card best suited to be the target of the team score recording data 1d on the basis of those conditions.

Specifically, under conditions such as a condition 1 "when the team record number has been limited, having the least number of teams currently recorded," a condition 2 "when the recording frequency of the ID card has been limited, having the lowest current recording frequency," and a condition 3 "having the greatest remaining recordable capacity on the ID card," one of ID cards is determined as the ID card best suited for use as the recording target.

The ID card data writing means 18h is the means for writing the recording data such as the team score recording data 1d on the ID card via the ID card reader/writer 12b of the card processing unit 12, according to the designation of the game progress controlling means 18e and records information showing the competition score or the competition score result during progress of the game by the cooperative competition of teams recognized by the team recognition means 18c, in both or at least one of the first and the second recording media (the first player and another player) as the team score recording data for the team which corresponds to the user identification information of the cooperator.

The ID card data writing means 18h records present team score recording data 1d on the ID card determined by the recording target ID card determination means 18g as corresponding to the user-specific ID (the user-specific ID of one or more partners belonging to the team), determines whether or not old team score recording data 1d exists on any other ID card, and, if any, deletes that data. Or, the team score recording data of a just finished play may be overwritten on the ID card in which the team score recording data 1d already exists.

In other words, with the ID card data writing means 18h, when recording in the cooperative play mode, team score recording data is recorded on either one of the ID cards in accordance with the conditions 1 to 3 as described above, and, in the case where "both the self's ID card and the partner's ID card have been mounted and the team score recording data of the self and the team partner exists in at least one thereof," they are treated as if they have participated in the game and the processing of writing back the result of the game is executed on "that in which the team score recording data already exists" by overwriting or on "which fits the above conditions" by recording (deleting any old data).

When the recording target ID card determination means 18g determines the absence of the recording target ID card, for example, if any ID card exceeds the limiting value (defining the life of the ID card) of the condition 2, a screen encouraging purchase of a new ID card is displayed and, if the coin is inserted, the ID card issuing device 12d is directed to issue a new ID card. Subsequently, the ID card data writing means 18h writes the user-specific ID of the original ID card on the new ID card for continuation of the record and writes other recorded data from the original ID card for continuation of the record, and writes the team score recording data 1d of the just finished play on the new ID card. Conversely, with the ID card data writing means 18h, when, for example, the recording target ID card determination means 18g determines that no ID card has any remaining recording capacity and the recording target ID card has been exhausted, a screen for selecting score recording data to be deleted is displayed, to allow deletion of the score recording data selected by the player so that the team score recording data 1d of the just finished play can be written in. Or, the following processing is executed: after the new ID card is issued by the ID card issuing device 12d, the user-specific ID of the original ID card is written on the new ID card for continuation of the record and the team score recording data 1d of the just finished play is written on the new ID card.

Figure 7:
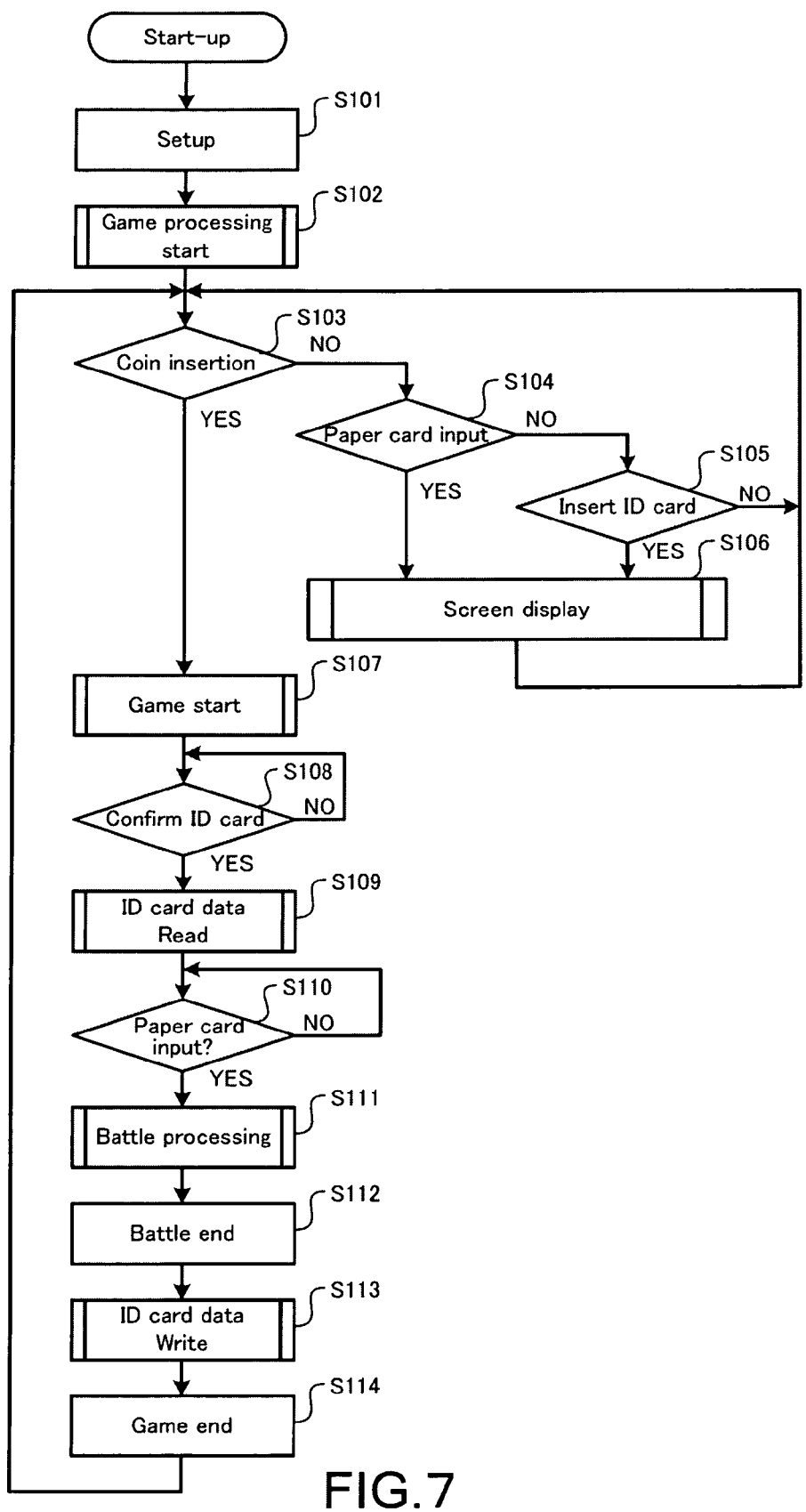
FIG. 7 is a flow chart explaining an outline of operations of the game machine according to the present invention.

According to the arrangement as described above, an example of the operation of the game machine according to the present invention will now be described. First of all, an outline of the operation of the game machine will be described with reference to the flow chart of FIG. 7.

When power is supplied to the game machine, a control unit 10 (10A and 10B) of each game device 10 constituting the game machine operates an initial processing such as inspection of the operation of apparatus and then sets up a game processing program (software of the game-processing unit 18) (step S101).

The game-processing unit 18 is in standby status until input of a signal indicating detection of insertion of a coin and starts the game processing such as displaying, for example, an advertising screen (step S102). In the standby status, the game processing as described above is executed and monitors whether or not the coin has been inserted (step S103). In the status of not having detected insertion of a coin, when a detection signal for a game card (the character card or the auxiliary card as described above) possessed by the player is inputted (step S104,) or when a signal detecting insertion of an ID card possessed by the player is inputted (step S105,) the screen encouraging insertion of a coin is displayed and the unit waits for insertion of the coin (step S106.)

When insertion of the coin is detected in step S106, the game-processing unit 18 first releases the standby status to start the game (step S107), and then confirms that an ID card is mounted on the ID card mounting unit 12a by a sensor detection signal of an ID card reader/writer (step S108,) to read the data on the ID card (step S109.) Subsequently, the screen encouraging insertion of the game card into the character card reading slot 12e is displayed and the code of the game card inserted by the player is read (step S110). Then, on the basis of the data of the ID card and the data decoded from the code on the game card, battle processing (processing of the competition game in person-vs-person or the competition game against the CPU) with personal play or with cooperative play is executed (step S111). Following the completion of the battle (step S112), the play score (personal score recording data or team score recording data) is written on the ID card (step S113) to finish the game (step S114). Then, the status returns to step S103 for standby.

Figure 8:
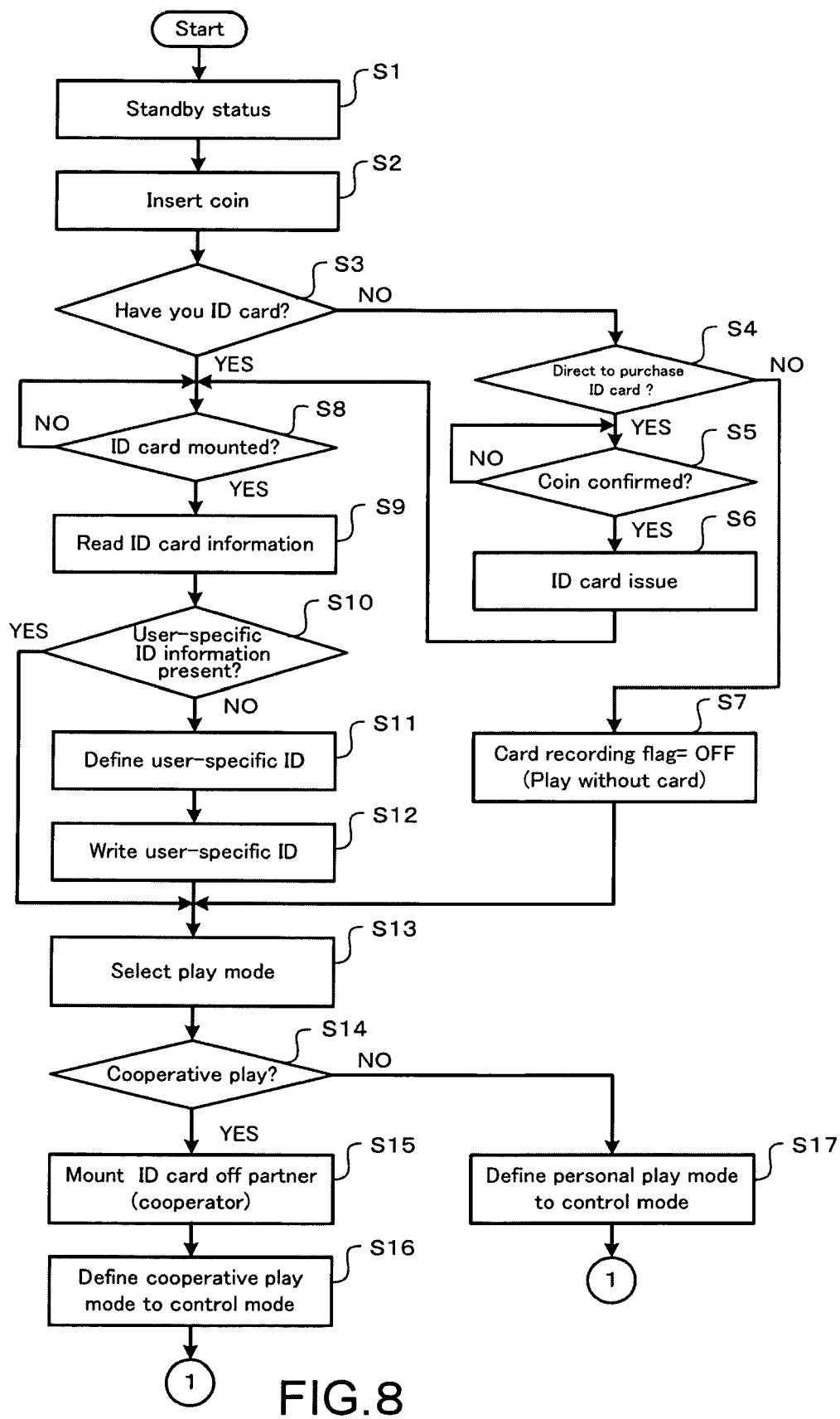
FIG. 8 is the flow chart explaining an example of the operations of the game-processing unit of the game machine according to the present invention.
Figure 9:
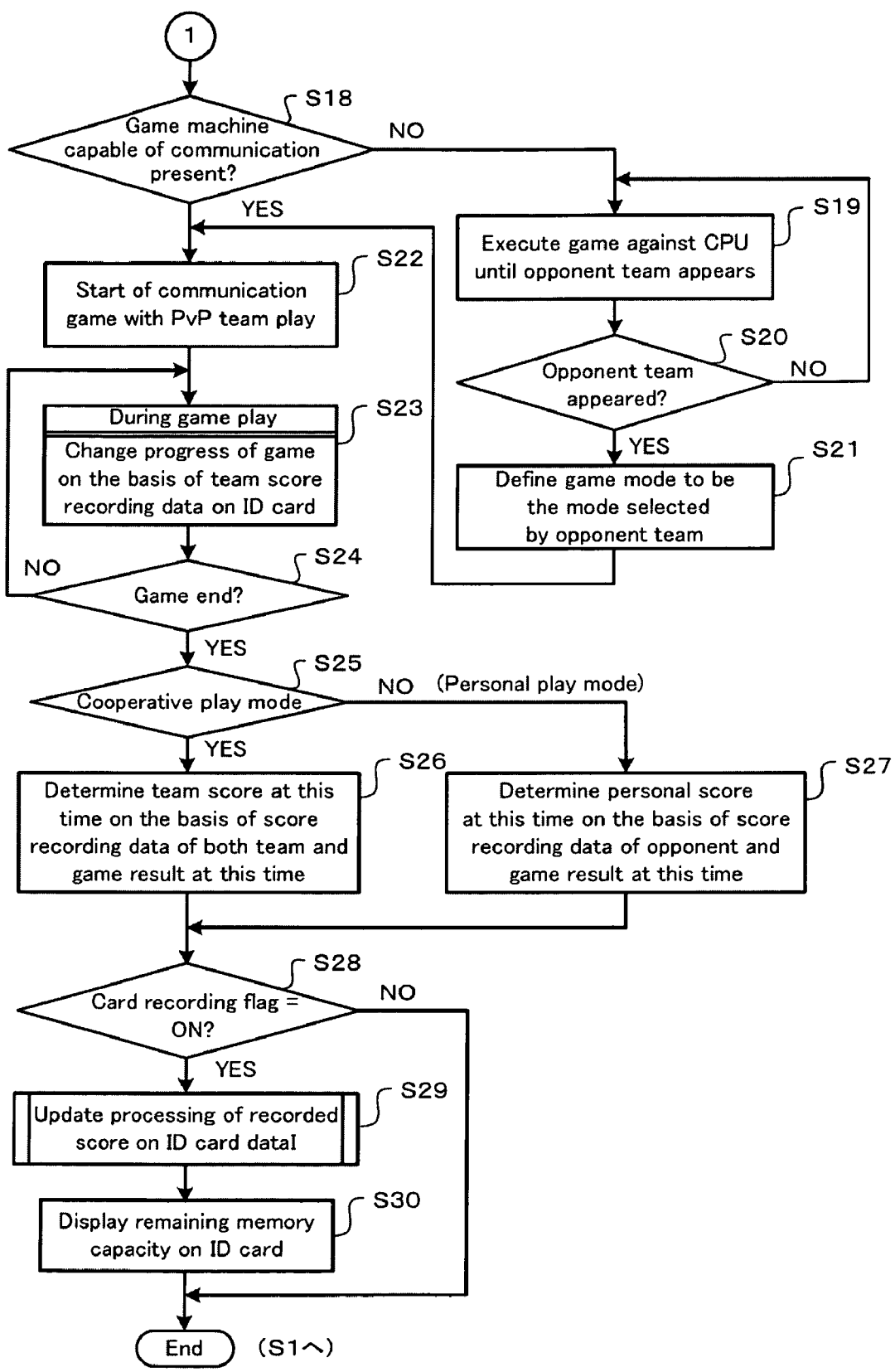
FIG. 9 is a partial figure of the flow chart of FIG. 8.

Next, an example of the operation of the game-processing unit of the game machine according to the present invention will be described with reference to the flow charts of FIG. 8 and FIG. 9. The description relates to the processing of the ID card, and description of the processing of the game card (the character card or the auxiliary card) are omitted. For the processing of each means 18a to 18h of the game-processing unit 18, the description is partially omitted because of duplicable description and is mainly made for a whole operation as follows.

In the game-processing unit 18 of the game device 10, the advertising screen is displayed on the image display unit 15 in the standby status (step S1), the coin (or medal) is inserted in the insertion slot 19a of the game case in the standby status (step S2), and, as a guiding screen, "the screen encouraging that if the player has an ID card, to set it on the ID card mounting unit 12a and if the player has no ID card, to depress a button of the operation unit 13" is displayed on the image display unit 15. Then, the game-processing unit 18 detects the presence or absence of a mounted ID card by the signal from the card processing unit 12 and detects the operation of the button, if operated, by the signal from the operation unit 13.

The game-processing unit 18 determines whether or not the player has an ID card by those detection signals (step S3). For example, when determination that the ID card has been not mounted and that the button was depressed is made, determination is made that no ID card is held by the player and the guiding screen is displayed encouraging the player to determine whether or not to purchase an ID card. When the direction is made to purchase an ID card (step S4), the insertion of the coin is confirmed by the signal from the coin handling unit 19 (step S5) and then the ID card issuing device 12d is driven to transfer an ID card from the card pooling unit to the ID card issuing slot 12c for issuing (step S6) and the screen encouraging the player to mount it the ID card mounting unit 12a is displayed. On the other hand, when the direction that the ID card is not purchased is made in step S4 as described above, OFF is set as a card recording flag (initial value=ON) showing presence or absence of the record in the ID card and the game processing is carried out as game play without the card (step S7).

Following the processing of ID card issue of step S3 as described above or step S6 as described above, when the mounted ID card is detected by the card processing unit 12 (step S8), the game-processing unit 18 reads and stores information from the ID card in memory unit 14 via the ID card reader writer 12b (step S9), and checks whether or not the user-specific ID (in the present example, the name as a component element thereof) is registered on the ID card (step S10).

In the case where no user-specific ID has been registered on the ID card or no game score data for that person or the team of that player has been recorded on the mounted ID card, the game-processing unit 18 determines that the player is using the ID card for the first time and, after defining the user-specific ID, writes the user-specific ID in the memory unit of the ID card via the ID card reader/writer 12b to register the user-specific ID on the ID card. According to the present embodiment, when the ID card is issued by the ID card issuing device 12d, the system-specific ID is already given to the ID card and the system-specific ID+the user name (free name) is defined as the user-specific ID. Specifically, in the game-processing unit 18, after the name-inputting screen is displayed on the image display unit 15 and the user name is inputted by operation of the operation unit 13 by the player, the system-specific ID+the user name is defined as the user-specific ID (step S11), and the inputted player name is written in the player name area in the ID card to register the user-specific ID card (step S12). To simplify the game operation, inputting and defining the user name may be omitted and the system-specific ID, as given already to the ID card, may be used as the user identification information.

After the user-specific ID of the ID card is confirmed in step S10 or the registering processing of the user-specific ID in the ID card is completed in step S12 as described above, the game-processing unit 18 displays the guiding screen showing the play mode of the game to request the player to select the play mode of the game (step S13).

Below, the play mode of the game is described. The mode of the game includes a mode 1 for playing the game by communicating with another game device, a mode 2 for playing the game without communication with another game device, a mode 3 for play by a single person, and a mode 4 for playing in cooperation with a friend (cooperator) to make a team. In this section, the mode comprising a combination of the mode 1 with the mode 4, in other words, the communication game mode for two or more players (two in this example) playing in cooperation to make a team is described as the example (hereinafter, the game played in this mode is called "cooperative play type communication game").

The cooperative play type communication game according to the present invention (a communication game with the participation of multiple persons) includes, for example, games exemplified by a battle game, in which a self character operated on the screen according to the operations made by the player battles with an opponent character, and a role playing game, in which the self character and the opponent character move in a game space to develop a predetermined story. In this section, an example is given in which the team composed of two players cooperates to play by using the game device 10a, which is shown in FIG. 2, and compete to win against a team using the game device 10b side of the game machine shown in FIG. 2. As follows, the description is made with the team on the game device 10a named as "team A" and the team on the game device 10b named as "team B."

After the play mode of the game is selected in step S13, the game-processing unit 18 determines whether or not cooperative play is selected (step S14), and if cooperative play is selected, a screen encouraging players to mount the ID card of the partner (cooperator) is displayed (step S15), the processing of step S3 to step S12 as described above is executed and, then, the cooperative play mode is defined in a control mode (step S16). Conversely, if personal play is selected in step S14 then the personal play mode is defined in the control mode (step S17).

In the case of the cooperative play mode, the game-processing unit 18 of the game device 10a communicates with other game machines to monitor whether a standby game machine (in the present example, the game device 10b) is present or absent during the operation of selecting the cooperative play type communication game (step S18) and, if a communicable game machine (game device desiring competition) is absent, executes the game against the CPU until an opponent team appears (step S19 and S20). When an opponent team appears, the game mode is set to the mode selected by the opponent team (step S21) to start the communication game as PvP team play (step S22). On the other hand, in step S18, when the determination is made that the communicable game machine is present, the communication game is started as PvP team play at that point (step S22).

During the game (including the start and the finish) the processing to change the progress of the game is executed on the basis of team score recording data on the ID card of the two players belonging to the team A and team score recording data of the ID card of the two players belonging to the team B. However, at that time, the difficulty level of the game in the competition to win is set by the players and no control of the difficulty level is carried out by the CPU in executing the processing of the competition game, resulting in winning or losing on the basis of the skill of the people involved (step S23).

After the competition game by the team A vs the team B has ended (step S24) the game-processing unit 18 determines the team score at this time on the basis of the score recording data of both teams and the current game result (step S25, S26).

Conversely, in the personal play mode, the personal score at this time is determined on the basis of the score recording data of the opponent and the current game result (step S27).

Then, depending on whether the card recording flag is checked ON or OFF (step S28) a update processing of the score recording data of the ID card is operated for the ID card for which the card recording flag is ON (step S29). After the update processing of the ID card has ended, a screen showing the remaining memory capacity of the ID card is displayed to end the game (step S30) and the machine returns to step S1 to await the start of the next game.

Figure 10:
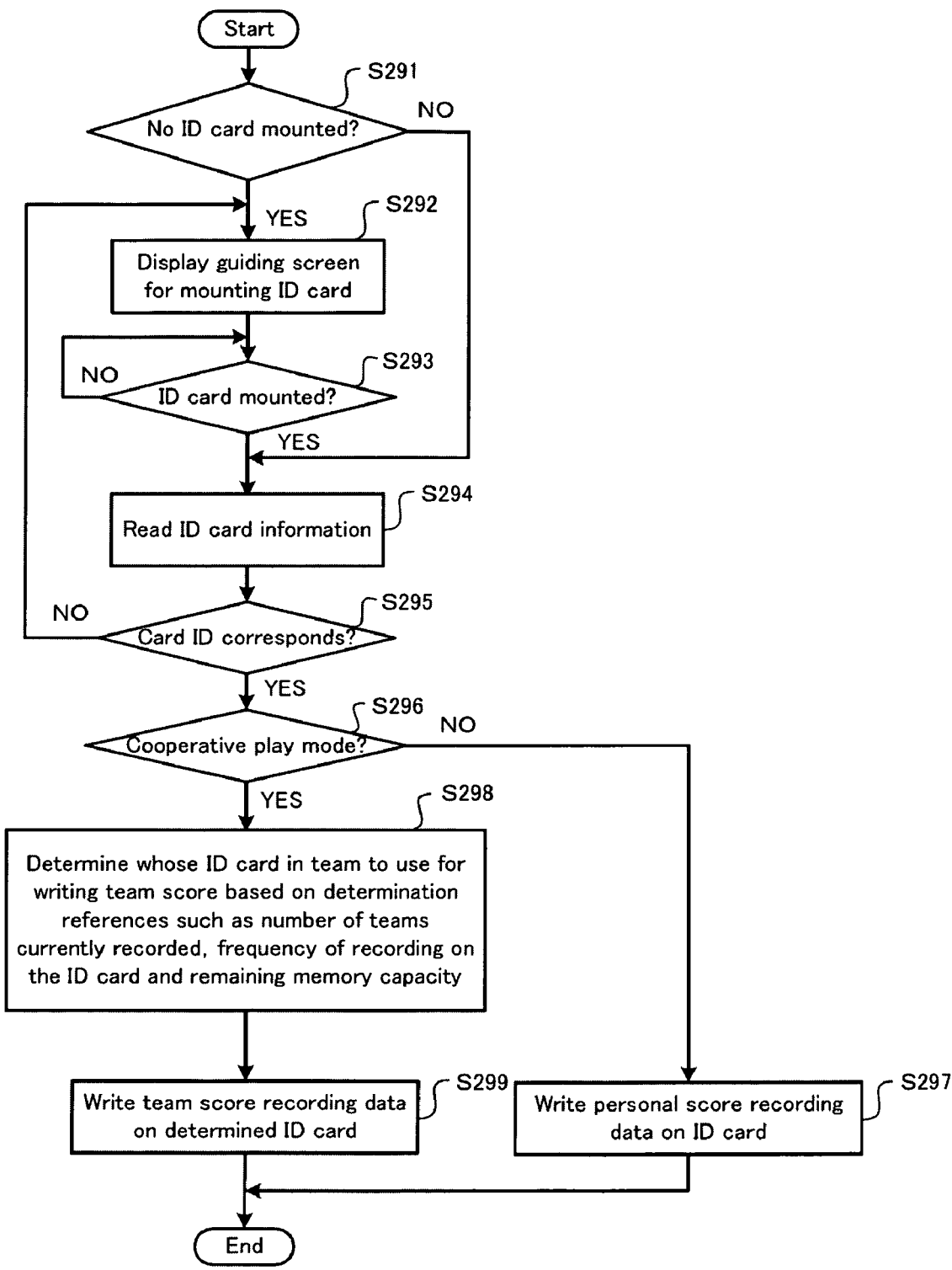
FIG. 10 is the flow chart explaining processing for updating the ID card according to the present invention.

Next, the details of the update processing of the ID card in step S29 as described above are described with reference to the example, with reference to the flow chart of FIG. 10. The processing of the game device 10a on the team A side is the same as that of the team B in the game device 10b and, therefore, the processing is described generally as that of the game device 10.

The game-processing unit 18 of the game device 10 determines whether or not an ID card is mounted in the ID card mounting unit of the reading ID card reader/writer for reading ID card information in step S9 (step S291) and, if the ID card is not mounted, determines that the ID card was erroneously removed during the game, then displays the guiding screen encouraging players to remount the ID card (step S292). Conversely, when the mounted ID card is confirmed (step S291 or step S293), information from the ID card is read (step S294) and it is determined whether or not the card ID (the user-specific ID) of the ID card corresponds to the card ID (the user-specific ID) of the ID card which has been stored in step S9 (step S295). In the case where the card IDs do not correspond to each other, the process returns to step S292 and displays the user-specific ID of the ID card in the memory of step S9 or the user name, for example, to display the guiding screen encouraging players to mount the appropriate ID card.

Then, when consistency of the card ID is confirmed in step S295, the processing determines whether or not the mode is the cooperative play mode (step S296). If the mode is not the cooperative play mode, it is determined as the personal play mode, and proceeds to write the personal score recording data in the ID card (step S297), whereby the update processing of the ID card is ended.

Conversely, if the mode is the cooperative play mode, the processing determines whose ID card in the team A (B) the team score should be written in on the basis of the number of teams currently recorded, the frequency of recording on the ID card, and the remaining area of the memory capacity as the determination references. For details, refer to the processing of the recording target ID card determination means 18g as described above (step S298). The team score recording data is written in the determined ID card to end the update processing of the ID card (step S299).

Now, the recording mode of the ID card according to the present invention will be described with reference to the example. FIG. 11A to 11C show the data constitution of an ID card in which the team score recording data have been written. As shown in FIG. 11A, FIG. 11B, and FIG. 11C, the user-specific ID of the ID card 1a is defined as "a," the user-specific ID of the ID card 1b is defined as "b," and the user-specific ID of the ID card if is defined as "f."

For example, if it is assumed that at the start of the game, on the basis that the ID card 1a and the ID card 1b are mounted on the two ID card mounting units of the game machine, the data in which the user-specific ID has "a" as the cooperator is located in the team score recording data of the ID card 1b with the user-specific ID "b," and it can be recognized that the player having the user-specific ID "a" and the player having the user-specific ID "b" had previously made up a team. Then, when the game of the team is ended and the team score recording data is written as the result of the game, in the present example, because the ID card 1b satisfies all conditions including the remaining area of the memory capacity, writing is carried out by overwriting on the ID card 1b. Thereafter, in the case where the status changes such that ID card 1b does not satisfy all the conditions including the remaining memory capacity, and the ID card 1a instead satisfies all the conditions, the team score recording data (the score recording data with the cooperator b) is written in the ID card 1a and the team score recording data (the score recording data with the cooperator a) in the ID card 1b is deleted.

Conversely, with reference to the data example of the ID card shown in FIG. 11C, in comparison with the ID card 1a and the ID card 1b, the number of teams recorded is small and the space (the remaining memory capacity) is greatest. However, the team score-recording data of the user-specific ID "f" has been recorded on the ID card 1a and the ID card 1b. This is a case where the frequency of recording on the ID card is limited. This may be because the personal play frequency is high or the frequency of cooperative play with the same team is high, resulting in more frequent recording on the ID card if in comparison with the other ID cards 1a and 1b. When the recording target ID card is determined, if each ID card satisfies the multiple conditions, a single recording target ID card is determined in a predetermined priority order.

FIG. 12 to FIG. 17 are explanatory figures relating to the game score data and indication mode thereof in the present embodiment. More specifically, they are conversion tables for converting competition conditions for the game played, and winning and losing under those conditions, to point values. In the present embodiment, the frequency of each condition being satisfied is recorded as a game score. When the game score is read from the ID card, the game score is converted to points on the basis of the conversion table of FIG. 12 and the points are converted to a "class" on the basis of the title conversion table of FIG. 16. The result is displayed as the game score of the player on the display means as the score indication screen shown in FIG. 17. FIG. 13 to FIG. 15 are tables expressing the conditions of FIG. 12 to be applied and recorded according to the particular combination of the competition. As follows, examples thereof will be described.

On each of the ID cards, the frequency of satisfied conditions A to D of FIG. 12 has been recorded on the basis of the past competition history of the player. For example, for the condition A of FIG. 12 in FIG. 5, "competition winning frequency=1" and "competition losing frequency=1" has been recorded as "the personal score recording data." In the following example, similar descriptions have been made for the conditions B and C.

Also for "the score recording data of the team b," each condition has been recorded as "competition winning frequency of the team b=1" and "competition losing frequency of the team b=1." In the following example, similar descriptions have been made for score recording data of a team c, and score recording data of team d and so on.

When the game machine reads these pieces of data, the frequency of satisfied conditions A to D of FIG. 12 is read from the personal score recording data in a single play to be converted to points on the basis of the table of FIG. 12. For example, if "competition winning frequency=1" and "competition losing frequency=1" are assumed, conversion to 10 points and 5 points are made respectively, to give a total "competition points=15 points." As follows, the frequency with which competition bonus point (the condition B), competition rank bonus point (the condition C), and competition vs CPU point (the condition D) conditions are satisfied is read to be each converted to points, and each total is displayed in a column of "battle points" on a score display screen in FIG. 17. On the other hand, in the case of playing as the team b, when the data of the ID card of another player making up the team b is read, the "score recording data of the team b," which has been recorded in the ID cards of individual players or at least one of them, rather than the personal score recording data of each player, is read to be converted to points on the basis of the table of FIG. 12 and finally displayed in the column of "battle points" on the score display screen in FIG. 17. With regard to the game mode, it is previously determined which of the conditions A to D in FIG. 12 has a correspondence. FIG. 13 to FIG. 15 show the correspondence.

More specifically, which of the conditions A to D is satisfied is determined according to "whether the self plays the competition as the team or plays the competition as the single person", "whether the opponent plays the competition as the team or plays the competition as the single person", "whether or not the self/other player of the team/the opponent of the competition uses the ID card," and "whether the opponent of the competition is controlled by the CPU or the PvP competition." For example, FIG. 13 shows, in the communication competition game system connecting two sets of the game devices to each other by communication means, when the first player and a second player as the opponent in the competition use an ID card and do not use it respectively, the frequency of satisfying any one condition of the conditions A to D is added or not. In this case, both the first player and second player use the ID card for competition and if the data relating to the strength of the character read from the game card used by the first player are smaller than those of the second player, if the second player has had three or more consecutive wins, and if the ranks of the first player and the second player are same, then when the first player wins, the frequencies of "win in a competition (A)," "lower strength than the opponent (B)," "win against an opponent who has had three or more consecutive wins (B)," and "win against a player of an equal rank (C)" are added to the personal score recording area of the ID card of the first player. Conversion of these frequencies to points on the basis of FIG. 12 gives 10 points, 5 points, 5 points, and 50 points, respectively, to add a total of 70 points to the battle points of the first player.

In the present embodiment, the "frequency" of satisfying conditions of FIG. 12 is recorded in the ID card and converted to points when the record is read out for use on the score display screen of FIG. 17. The points defined as corresponding to each condition of Table 12 may be recorded in the ID card.

According to the present embodiment as described above, the constitution of the card processing unit is, as exemplified in FIG. 4, described with reference to an example having apparatus (the apparatus of symbols 12c to 12h) related to the processing of issuing the ID card, the processing of issuing the character card, and the processing for code reading. These apparatuses are additional elements and the ID card processing system according to the present invention can be applied to a game device not having these apparatuses (a game device having one or more demountable drives capable of reading and writing the recording medium) and not having the coin handling unit 19 in FIG. 13. Furthermore, the invention can be applied to a game system for operating the communication game by connecting the game device via a network. In other words, application is possible to general data processing devices (such as a home game device, personal computer, and portable phone) that exclude a commercial game machine, having game functions.

The invention claimed is:

1. A game machine using a recording medium demountable from a mounting unit of a main body of the game machine and capable of writing data, the game machine having a cooperative play mode for playing by cooperating with other players as cooperators, said game machine comprising:
   a team recognition means for reading the data of a first recording medium mounted on the mounting unit by a first player and reading the data of a second recording medium mounted on the mounting unit which is identical to the mounting unit as described above or another mounting unit by another player, checking whether a recording medium-specific ID of the other player is recorded in the first recording medium or whether the recording medium-specific ID of the first player is recorded in the second recording medium, and determining both to be a team when the recording medium-specific ID other than self's recording medium-specific ID has been recorded in at least one; and
   a data writing means for ascribing information expressing a play score during a progressing game or a result of competition by cooperative competition of teams recognized by the team recognition means to the recording medium-specific ID of the cooperator to record it in at least one recording medium of the first and the second recording media as team score recording data of the team.

2. A game machine according to claim 1, comprising a recording target determination means for determining one recording medium of the first and the second recording media to be a recording target of the team score recording data.

3. A game machine according to claim 2, wherein the data writing means determines whether the team score recording data of the team is present or not in the recording medium determined by the recording target determination means, and if present, the team score recording data is written by overwriting.

4. A game machine according to claim 2, wherein the data writing means determines whether the team score recording data of the team is present or not in the recording medium determined by the recording target determination means and if not, the team score recording data is written, and determines whether the team score recording data of the team is present or not in the recording medium of the other constituting member and if present, the team score recording data is deleted.

5. A game machine according to claim 2, wherein the recording target determination means determines the recording target on the basis of a determination reference containing a number of the teams determined by a number of the team score recording data recorded in the recording medium separately according to the teams, a current recording frequency of the recording medium, and a remaining memory capacity of the recording medium.

6. A game machine according to claim 1, wherein the recording medium-specific ID is composed of a system-specific ID and a user name defined by the player.

7. The game machine according to claim 1, comprising a game progress controlling means for changing game progress in the cooperative play mode on the basis of the team score recording data.

8. A game machine according to claim 7, comprising a means for determining a cooperative play level expressing an excellence degree of the score of the team at a start of the game on the basis of the team score recording data, wherein the game progress controlling means changes the game progress in the cooperative play mode according to the cooperative play level.

9. A game machine according to claim 1, comprising a team score evaluation means for evaluating the play score of the team on the basis of an evaluation factor containing the team score recording data and an execution result of the game, wherein the data writing means updates the team score recording data on the basis of an evaluation result of the team score evaluation means.

10. A game machine according to claim 1, wherein the data writing means ascribes the data of the play score to the recording medium-specific ID of the cooperator to record in the recording medium by relating it to a team name defined by the player.

11. A game machine according to claim 1, comprising a recording medium issuing means for issuing the recording medium following insertion of a coin.

12. A game machine according to claim 1, wherein the game machine is a communication game machine configured integrally by assembling cases of two sets of game devices connected communicably.

13. A game machine according to claim 1, comprising a user identification information registering means for registering user identification information to identify the player in a memory unit of the recording medium possessed by the player.

* * * * *